(12) United States Patent
Sugimoto

(10) Patent No.: US 10,773,661 B2
(45) Date of Patent: Sep. 15, 2020

(54) CONTROL DEVICE AND CONTROL SYSTEM

(71) Applicant: Yazaki Corporation, Minato-ku, Tokyo (JP)

(72) Inventor: Terumitsu Sugimoto, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 131 days.

(21) Appl. No.: 15/984,983

(22) Filed: May 21, 2018

(65) Prior Publication Data

US 2018/0334114 A1 Nov. 22, 2018

(30) Foreign Application Priority Data

May 22, 2017 (JP) .................................. 2017-100847

(51) Int. Cl.
*B60R 16/02* (2006.01)
*B60R 16/03* (2006.01)
*B60R 16/023* (2006.01)

(52) U.S. Cl.
CPC ........ *B60R 16/0207* (2013.01); *B60R 16/023* (2013.01); *B60R 16/0238* (2013.01); *B60R 16/03* (2013.01)

(58) Field of Classification Search
CPC ....... B60R 16/02; B60R 16/023; B60R 16/03; B60R 16/0238; B60R 16/0207
USPC ........ 307/10.1, 9.1, 10.2, 43, 66, 64, 38, 80; 710/308; 375/224
See application file for complete search history.

(56) References Cited

U.S. PATENT DOCUMENTS

2012/0020401 A1* 1/2012 Itou ........................... G06F 3/00
375/224
2015/0051787 A1* 2/2015 Doughty ................ G07C 5/008
701/31.5
2015/0149682 A1* 5/2015 Uemura .................. G06F 13/28
710/308

(Continued)

FOREIGN PATENT DOCUMENTS

JP        8-289401 A     11/1996
JP     2010-195133 A      9/2010
JP     2010-245988 A     10/2010

(Continued)

*Primary Examiner* — Rexford N Barnie
*Assistant Examiner* — Jagdeep S Dhillon
(74) *Attorney, Agent, or Firm* — Sughrue Mion, PLLC

(57) ABSTRACT

A control device includes a plurality of input ports to which electrical components are connected, a potential setting unit that sets the plurality of input ports to have any one of a first reference potential and a second reference potential different from the first reference potential, an ID specifying unit that specifies identification information of the control device based on a combination of electric potentials of the plurality of input ports, a storage unit that stores the specified identification information, and a control unit that controls the electrical component based on the specified identification information. In the control device, in a given case, the ID specifying unit prohibits the identification information specified at the start of the control device from being written into the storage unit for a prescribed time, and specifies the identification information again after the prescribed time and writes it into the storage unit.

6 Claims, 8 Drawing Sheets

(56) References Cited

U.S. PATENT DOCUMENTS

2015/0370610 A1* 12/2015 Amann ............... H04L 61/3015
710/308

FOREIGN PATENT DOCUMENTS

| JP | 2012-1180 A | 1/2012 |
| JP | 2014-230097 A | 12/2014 |
| JP | 2015-122732 A | 7/2015 |

* cited by examiner

FIG. 4

| CONNECTION CONDITION | INPUT PORTS | | | | NOTES |
|---|---|---|---|---|---|
| | P11 | P12 | P13 | P14 | NUMBER OF AVAILABLE PORTS |
| ID1 | O | O | O | O | 4 |
| ID2 | O | O | O | GND | 3 |
| ID3 | O | O | GND | O | 3 |
| ID4 | O | GND | O | O | 3 |
| ID5 | O | O | GND | GND | 2 |
| ID6 | O | GND | GND | O | 2 |
| ID7 | O | GND | O | GND | 2 |

| | GENERAL INPUT | MOMENTARY SW ONLY Lo ONLY IN OPERATION |
|---|---|---|

ILLUSTRATION OF SYMBOL [O: AVAILABLE INPUT PORTS, GND: GROUND POTENTIAL UPON W/H CONNECTION]

CONTROL DEVICE AND CONTROL SYSTEM

CROSS REFERENCE TO RELATED APPLICATION

This application is based on Japanese Patent Application No. 2017-100847 filed on May 22, 2017, the contents of which are incorporated herein by reference.

BACKGROUND

1. Technical Field

The present invention relates to a control device and a control system usable for identifying control devices in a control system including a plurality of control devices connected with each other via such as a wire harness.

2. Background Art

In a vehicle, various loads such as a lamp, an electric motor, and a heater, and input elements such as a switch and a sensor are separately disposed at various places of the vehicle body as electrical components. Therefore, in a case of designing an onboard system with the plurality of loads and input elements, it is possible to reduce length, weight and power loss of a wire harness by arranging each of electronic control units (ECU) at position close to corresponding electric component.

However, in order to control all the electrical components in the vehicle in cooperation with each other, it is necessary to connect the plurality of electronic control units with each other via a communication line, so as to exchange instructions or data therebetween. A plurality of slave control units and at least one master control unit may be used. In this case, the master control unit manages the plurality of slave control units.

As mentioned above, in a control system in which a plurality of electronic control units are connected with each other via a common communication line, it is necessary to identify a connection source node and a destination node of each of the electronic control units during data communication thereof by using a unique identifier (ID). However, in an actual system in a vehicle, it is a must to consider how to assign identifiers to the electronic control units at nodes since the number of electronic control units and the number and types of connected electrical components may change variously.

For example, in an onboard machine control system in JP-A-2010-195133, a resistor is incorporated in each slave device. A slave device is configured to detect a DC voltage at a terminal of a resistor, so as to specify an identifier.

Also, in a control system in JP-A-2012-1180, an electronic control device (ECU) is configured to be capable of assigning node ID to a vehicle component connected thereto. Specifically, the control system includes an injector for each cylinder incorporating a press sensor and a communication driver, and the ECU bus-connected to the communication driver of the injector via a common communication line, such that a sensor signal from the press sensor is input into the ECU via a sensor line of the injector. After outputting a prescribed instruction for assigning node ID to the injector to the communication line, the ECU performs a process in which the sensor line of the injector is set to a ground voltage only at a time corresponding to the assigning node ID. Upon receiving the instruction, the injector measures time when the sensor line thereof is at the ground voltage, and specifies node ID based on the time.

Also, in a master-slave system in JP-A-2014-230097, there is disclosed a technique for determining node ID of a slave device easily, and for adding a slave device or detecting a breakdown easily at the same time.

Specifically, the master-slave system is configured to common bus-connect a master device and each slave device separately via a serial signal line and to connect the master device and each slave device separately via a daisy chain, and that a response message of a slave device in communication contains flag information containing a node ID setting state of another device and indicating a state of an upper stage device and a connection state of a lower stage device.

However, in a case as JP-A-2010-195133, where a particular component such as a resistor corresponding to an assigned identifier is incorporated into a slave device individually, an increase in component costs and manufacturing costs of slave devices is inevitable since types and part numbers of the slave devices are different with each other.

Also, in a case as JP-A-2012-1180, where an electronic control device assigns node ID to subordinate vehicle components, the electronic control device cannot identify a plurality of vehicle components in an initial state before assigning correct node ID. Therefore, there will be a problem, for example, signals transmitted by the plurality of vehicle components collide on the common communication line, and that time required until the entire system achieves a correctly operating state is inevitably long.

Even in a case as JP-A-2014-230097, where a response message of a slave device contains flag information containing a node ID setting state of another device and indicating a state of an upper stage device and a connection state of a lower stage device, the entire system cannot achieve a correctly operating state without a complicated time consuming communication procedure since node ID of slave devices is not determined in the initial state.

In a case as JP-A-2012-1180 and JP-A-2014-230097, where a higher-order control device determines node ID of lower-order control devices, there is a problem that the higher-order control device cannot grasp types of electrical components connected to output sides of the lower-order control devices. Therefore, in a circumstance as an onboard system, where various types of electrical components are connected to outputs of lower-order control devices, the lower-order control devices have to perform their own controls separately. As a result, an increase in component costs and manufacturing costs is inevitable since configurations and operation of the lower-order control devices cannot be commonized. Also, in a case of, for example, adding another electrical component to the system, significant changes have to be made to the operation of the control devices, and an increase in development costs is expected.

Considering the above matters, the present inventor devised the prior art prior to the present invention, through which a combination of potentials of a plurality of input ports in control devices in a steady state is associated with ID. According to the prior art, configurations of the control units can be commonized, and ID can be specified via, for example, a difference between connection states of the wire harness connected to the control devices.

However, in a case of adopting the above prior art, it is necessary to take a long time to some degree to determine that the control devices are in a steady state when specifying ID. This is because that, if a sufficient time is not cost, there is a concern that a wrong signal potential will be read, and that wrong ID will be assigned under an influence of such as chattering of a switch contact.

However, in the case of adopting the above prior art, a delay happens to operation of the entire system since it costs time for the control devices to specify their own ID. For example, waiting time until when electrical components in a vehicle achieve a normal operating state is long at start of an engine of the vehicle.

For example, if constant data of ID is kept in such as a ROM (read only memory) in advance, the above waiting time can be eliminated since it is unnecessary to monitor a signal that may change. However, it is not possible to add or reattach another electrical component in a factory or at a dealer's, since ID cannot be made flexible in that case. Also, in a case where a mistake is made in writing data corresponding to a component such as a ROM in such as a factory, this component becomes unusable and has to be disposed of.

Meanwhile, in the case of adopting the above prior art, a contact failure resulting from such as aged deterioration may happen in a place connected with the input ports. In this way, ID assigned to control units may change freely, causing malfunction of the electrical components.

The present invention is made in view of the above circumstances, and an object thereof is to provide a control device and a control system capable of commonizing configurations and operation of a plurality of control devices included in a system, and shortening waiting time required for specifying ID and changing ID assigning as necessary at the same time.

SUMMARY OF INVENTION (1) According to one aspect of the invention, a control device used as one of a plurality of control devices connected with each other via a vehicle wiring member including a power supply line and a communication line includes:
- a plurality of input ports to which electrical components are connected;
- a potential setting unit that sets the plurality of input ports to have any one of a first reference potential and a second reference potential different from the first reference potential;
- an ID specifying unit that specifies identification information of the control device based on a combination of electric potentials of the plurality of input ports;
- a storage unit that stores the specified identification information; and
- a control unit that controls the electrical component based on the specified identification information,
- wherein in a case where the identification information specified at start of the control device is different from the identification information stored in the storage unit, the ID specifying unit prohibits the identification information specified at the start of the control device from being written into the storage unit for a prescribed time, and specifies the identification information again after the prescribed time and writes it into the storage unit.

According to the control device with the configuration in (1), identification information assigned thereto is determined via a state of the potential setting unit determining the potentials of the plurality of input ports. Also, even in a case where the potentials of the input ports are easily changed, it is possible to specify suitable identification information in a short time via performing control corresponding to a comparison result of the identification information specified at the start of the control device and the identification information stored in the storage unit. That is, if the identification information specified at the start of the control device matches the identification information stored in the storage unit, operation can be started by using directly the identification information stored in the storage unit without time wait; if the identification information specified at the start of the control device does not match the identification information stored in the storage unit, it is possible to eliminate the influence of chattering of a switch contact via a prescribed waiting time, thereby preventing malfunction. Also, since the identification information is determined via the state of the potential setting unit, the identification information can be changed as necessary when adding and reattaching a component in such as a factory.

(2) In the control device of (1), wherein in a case where the storage unit is in an initial state, the ID specifying unit writes the identification information specified at the start into the storage unit before the prescribed time elapses.

According to the control device with the configuration in (2), it is possible to determine identification information to be used without a long waiting time even in a state where the storage unit is in the initial state. Also, since it is unnecessary to write particular identification information into the storage unit in the initial state, components of the storage unit can be commonized, and particular work of writing data is unnecessary, too.

(3) In the control device of (1) or (2), wherein, in a case where the identification information specified at the start is different from the identification information stored in the storage unit, the control unit prohibits control of the electrical component until the prescribed time elapses.

According to the control device with the configuration in (3), it is possible to prevent malfunction since the control of the electrical component is prohibited in a state where the identification information to be used thereto is not determined.

(4) According to another aspect of the invention, a control system includes:
- slave control units, each of which is the control device according to any one of (1) to (3); and
- a master control unit that controls the plurality of slave control units via the vehicle wiring member,
- wherein the master control unit, after satisfying a prescribed condition, controls an ID specifying unit of the plurality of slave control units to prohibit the identification information from being written into the storage unit.

According to the control system with the configuration in (4), it is possible to prevent the identification information used by the slave control units respectively from changing unnecessarily. In this way, it is possible to prevent malfunction of the entire system even in a case of such as a component breakdown, or where an abnormal potential is generated at the input ports resulting from mechanical vibration or an effect of aged deterioration.

According to the control device and the control system of the present invention, it is possible to commonize the configurations and operation of the plurality of control devices included in the system, since the identification information assigned to the control device is determined via potential setting unit. Also, the identification information can be changed as necessary when adding and reattaching a component in such as a factory. Also, even in a case where the potentials of the input ports are easily changed, it is possible to specify suitable identification information in a short time via performing control corresponding to a comparison result of the identification information specified at the start of the control device and the identification information stored in the storage unit. That is, if the identification information specified at the start of the control device matches the identification information stored in the storage unit, the operation can be started by using directly the identification information stored in the storage unit without time wait; if the identification information specified at the start of the control device does not match the identification information stored in the storage unit, it is possible to eliminate the influence of chattering of a switch contact via a prescribed waiting time, thereby preventing malfunction.

The present invention has been briefly described above. Further, details of the present invention will be clarified by reading a mode (hereinafter, referred to as "embodiment") for carrying out the invention described below with reference to attached drawings.

BRIEF DESCRIPTION OF DRAWINGS

FIG. 4 is a pattern diagram showing a specific example of a corresponding relationship between a design specification relating to use states of a plurality of input ports and ID assigned to a slave control unit.

FIG. 6 is a flow chart showing exemplary operation of the slave control units at power on.

DETAILED DESCRIPTION OF EMBODIMENTS

Specific embodiments according to the present invention will be described with reference to drawings.

<Overall of Control System>

Figure 1:
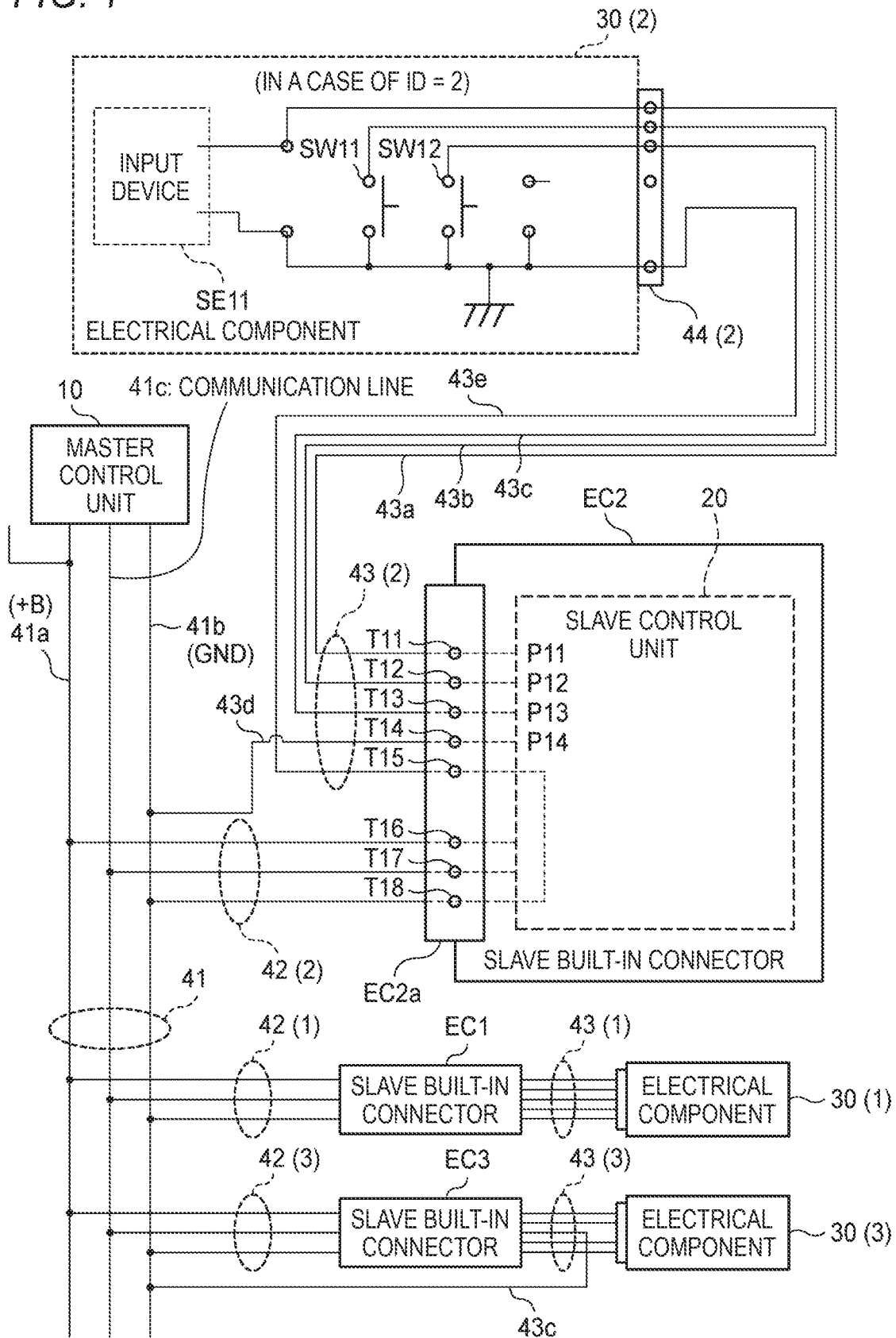
FIG. 1 is a connection diagram showing an exemplary configuration of a control system including control devices according to an embodiment of the present invention.

An exemplary configuration of a control system including control devices according to an embodiment of the present invention is shown in FIG. 1. The control system in FIG. 1 is assumed to be used to control various electrical components arranged in places of a vehicle. An electrical component to be controlled is assumed to include various input elements such as a switch and a sensor, and a load such as an electric motor, a heater, and a lamp.

In the example in FIG. 1, three electrical components 30(1), 30(2), 30(3) to be controlled are included in the control system. The three electrical components 30(1), 30(2), 30(3) are connected respectively to subordinates of slave built-in connectors EC1, EC2, EC3 incorporating electronic circuits of slave control units 20.

Each of the slave built-in connectors EC1, EC2 EC3 is a connector housing including a connection part for detachably connecting within electric wire assembly or between electric wire assembly and a device, with a space therein to accommodate an electronic circuit substrate of a slave control unit 20. The connection part EC2a is provided with a cavity capable of fixing each of multiple terminals (T11 to T18).

Also, the control system is provided with a master control unit 10 for controlling the entire system collectively. The master control unit 10 and the slave built-in connectors EC1, EC2, EC3 are electrically connected via a wire harness.

The wire harness included in the control system in FIG. 1 includes a main wire part 41 and sub harnesses 42(1), 42(2), 42(3), 43(1), 43(2), 43(3). The main wire part 41 of the wire harness is substantially configured by assembly of three electric wires: a power supply line 41a to which a prescribed DC power supply voltage (+B) is supplied, a ground (GND) line 41b, and a communication line 41c.

<Specific Example of Circumstances for Carrying Out Invention>

It happens that, for example, adding of another electrical component such as a LED and a lamp directly is desired for a control system used until change of a design specification in a vehicle. In a case where the control system with the configuration in FIG. 1 is mounted on a vehicle, it is assumed that another slave control unit 20 is connected to the main wire part 41 of the wire harness, and that another electrical component 30 is connected to a subordinate of the slave control unit 20.

Here, all of the slave control units 20 connected to the main wire part 41 of the wire harness use the common communication line 41c, and it is thus necessary to assign suitable unique identification information (ID), such that the master control unit 10, etc. can distinguish the slave control units 20 during communication thereof. However, if the unique identification information is assigned to each of the slave control units 20 in advance, it will be necessary to manage the slave control units 20 with different part numbers since the slave control units 20 have different types, causing an increase in manufacturing costs as well as component costs. Therefore, information indicating an ID value is not contained in the slave control units 20, so as to make it possible to adopt slave control units 20 with common configuration and part number.

Meanwhile, it is also not known in advance that, to which part of the vehicle such as a driver seat, a ceiling, and a door various electrical components 30 to be added are installed in a case where the electrical components 30 are general mass-produced products. Therefore, an identification information value of the electrical components 30 cannot be determined in advance, either.

Under the above constraints, the control device of the present invention can automatically assign suitable identification information to the slave control units 20. For example, the slave control unit 20 of the slave built-in connector EC2 in FIG. 1 reads potentials of terminals T11 to T14 at input ports P11 to P14, so as to specify identification information assigned thereto based on a combination of high/low potentials.

However, functions of existing components are made full use of in order to reduce the number of components to be added. Specifically, a signal having a prescribed potential in a steady state (off state) as a terminal connected with a momentary switch and a signal of a terminal not in use (empty state) are used in combination. Also, a terminal not in use is fixed to a specific potential such as a ground potential by using the wire harness. Details thereof will be described later.

<Detailed Configuration of Control System>

As shown in FIG. 1, the sub harness 42(2) includes three electric wires each having one end connected separately to the power supply line 41a, the ground line 41b, and the communication line 41c in middle of the main wire part 41. The other ends of the three electric wires are physically and electrically connected to the connection part EC2a of the slave built-in connector EC2 via terminals T16, T17, T18.

The sub harness 43(2) substantially connects the slave built-in connector EC2 and the electrical component 30(2). The sub harness 43(2) is configured as assembly of five electric wires 43a, 43b, 43c, 43d, 43e, and terminals T11 to T15 provided at one end of each of the five electric wires are fixed to the connection part EC2a. Four terminals T11, T12, T13, T14 are connected respectively to the input ports P11, P12, P13, P14 of an internal circuit of the slave control unit 20. Also, the terminal T15 is electrically connected to the terminal T18 via the internal circuit of the slave control unit 20. Therefore, the electric wire 43e connected to the terminal T15 of the sub harness 43(2) is used as a ground line.

The other ends of four electric wires 43a, 43b, 43c, 43e of the five electric wires 43a, 43b, 43c, 43d, 43e configuring the sub harness 43(2) are connected to the electrical component 30(2) via a connector 44(2). The other end of the electric wire 43d left is connected to the ground line 41b of the main line part 41. That is, an input port P14 inside the slave built-in connector EC2 is fixed to a ground (earth) potential constantly via the ground line 41b. Such a particular configuration is necessary for determining unique identification information used to specify the slave built-in connector EC2.

The electrical component 30(2) in FIG. 1 includes one input device SE11 and two switches SW11, SW12. Here, the input device SE11 may be various devices such as a sensor and a switch, and there is no significant restriction to a potential of an output signal thereof.

Meanwhile, each of the switches SW11, SW12 is a "momentary" type switch whose electrical contact is closed only during operation, and is used to detect input operation of a user on such as a prescribed push button. The type of the switches is limited to "momentary" in order to use the output potential for specifying identification information. Details thereof will be described later.

Since the electrical component 30(2) in FIG. 1 includes one input device SE11 and two switches SW11, SW12, the electrical component 30(2) can output electrical signals from three systems to the connector 44(2). Meanwhile, although the slave control unit 20 in the slave built-in connector EC2 includes the four input ports P11, P12, P13, P14, one input port thereof is empty since there are only input electrical signals from three systems.

Accordingly, the empty input port of the four input ports P11 to P14, which is not used in input of electrical signals, is used to determine identification information. In the example in FIG. 1, since the input port P14 in the slave built-in connector EC2 is empty, the potential thereof is constantly fixed to the ground potential by connecting the input port P14 with the ground line 41b via the electric wire 43d. This potential has a significant meaning when determining identification information.

Similarly to the slave built-in connector EC2, slave built-in connectors EC1, EC3 in FIG. 1 incorporate the slave control unit 20 separately. All of the slave control units 20 incorporated in the three slave built-in connectors EC1 to EC3 have a common configuration, and content of control (software) are also common. Therefore, it is possible to reduce costs by commonizing components.

As shown in FIG. 1, an electrical component 30(1) is connected to a subordinate of a slave built-in connector EC1 via a sub harness 43(1), and an electrical component 30(3) is connected to a subordinate of a slave built-in connector EC3 via a sub harness 43(3).

One end of each of five electric wires configuring the sub harness 43(1) is connected to the slave built-in connector EC1, and the other end thereof is connected to the electrical component 30(1). One end of each of five electric wires configuring the sub harness 43(3) is connected to the slave built-in connector EC3, and the other end thereof except an electric wire 43c is connected to the electrical component 30(3). The other end of the electric wire 43c is connected to the ground line 41b of the main wire part 41.

<Specific Example of Configuration of Electrical Components 30>

Figure 3A:
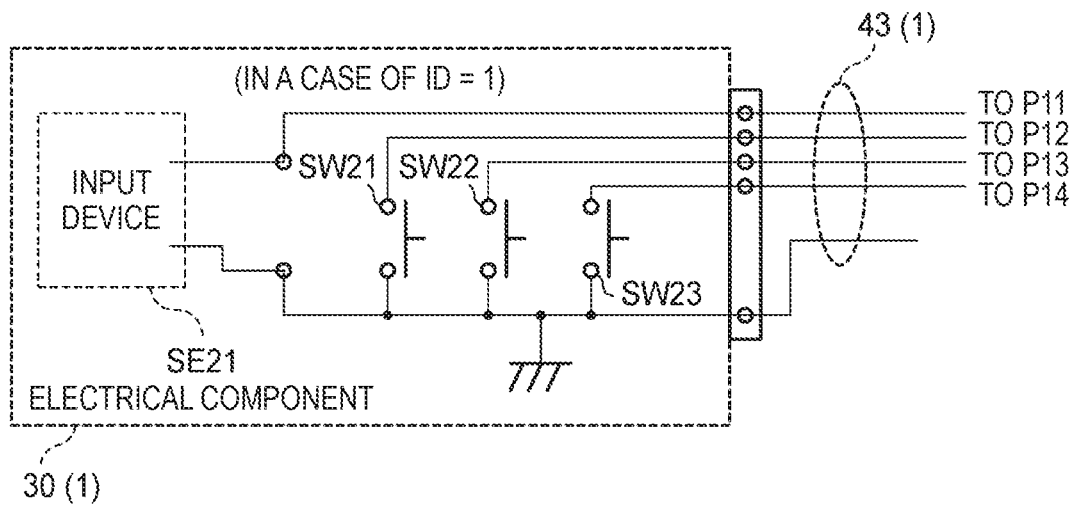
FIGS. 3A and 3B are electric circuit diagrams showing exemplary configurations of two electrical components assigned with different ID.
Figure 3B:
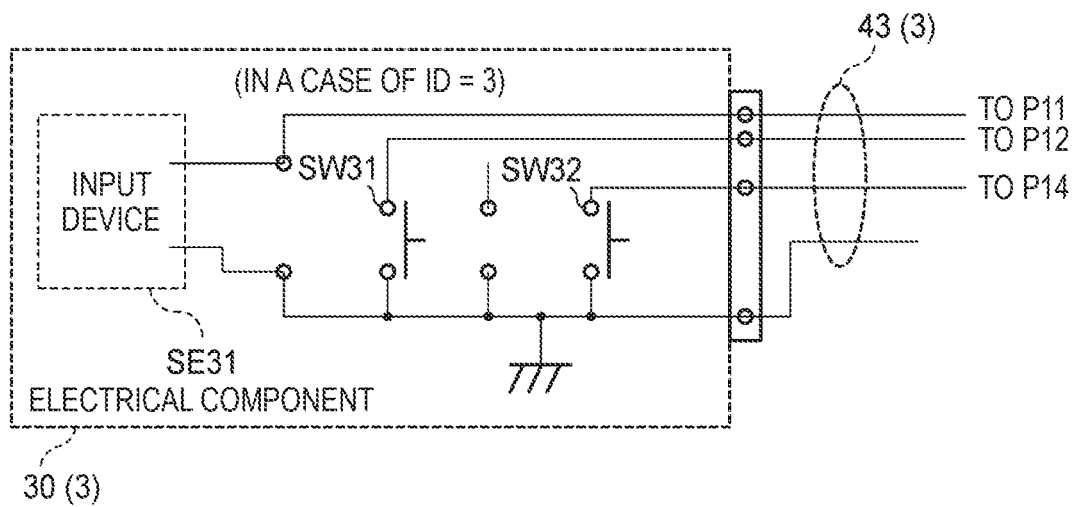

Electrical components 30(1), 30(3) are respectively configured as in FIGS. 3A and 3B. That is, the electrical component 30(1) shown in FIG. 3A includes one input device SE21 and three switches SW21, SW22, SW23. The three switches SW21, SW22, SW23 are of "momentary" type, and there is no particular restriction to the input device SE21.

Therefore, the electrical component 30(1) outputs electrical signals from four systems. Four of the five electric wires configuring the sub harness 43(1) are used to transmit the electrical signals from four systems output by the electrical component 30(1) to the input ports P11, P12, P13, P14 in the slave built-in connector EC1. One electric wire left is used to determine the ground potential.

The electrical component 30(3) includes one input device SE31 and two switches SW31, SW32. The two switches SW31, SW32 are of "momentary" type, and there is no particular restriction to the input device SE31.

Therefore, the electrical component 30(3) outputs electrical signals from three systems. Three of the five electric wires configuring the sub harness 43(3) are used to transmit the electrical signals from three systems output by the electrical component 30(3) to the input ports P11, P12, P14 in the slave built-in connector EC3. An input port P13 inside the slave built-in connector EC3 is connected to the ground line 41b via the electric wire 43c in FIG. 1, and is constantly fixed to the ground potential. One electric wire of the sub harness 43(3) left is used to determine ground potential of the electrical component 30(3).

<Exemplary Configuration of Slave Control Unit 20>

Figure 2:
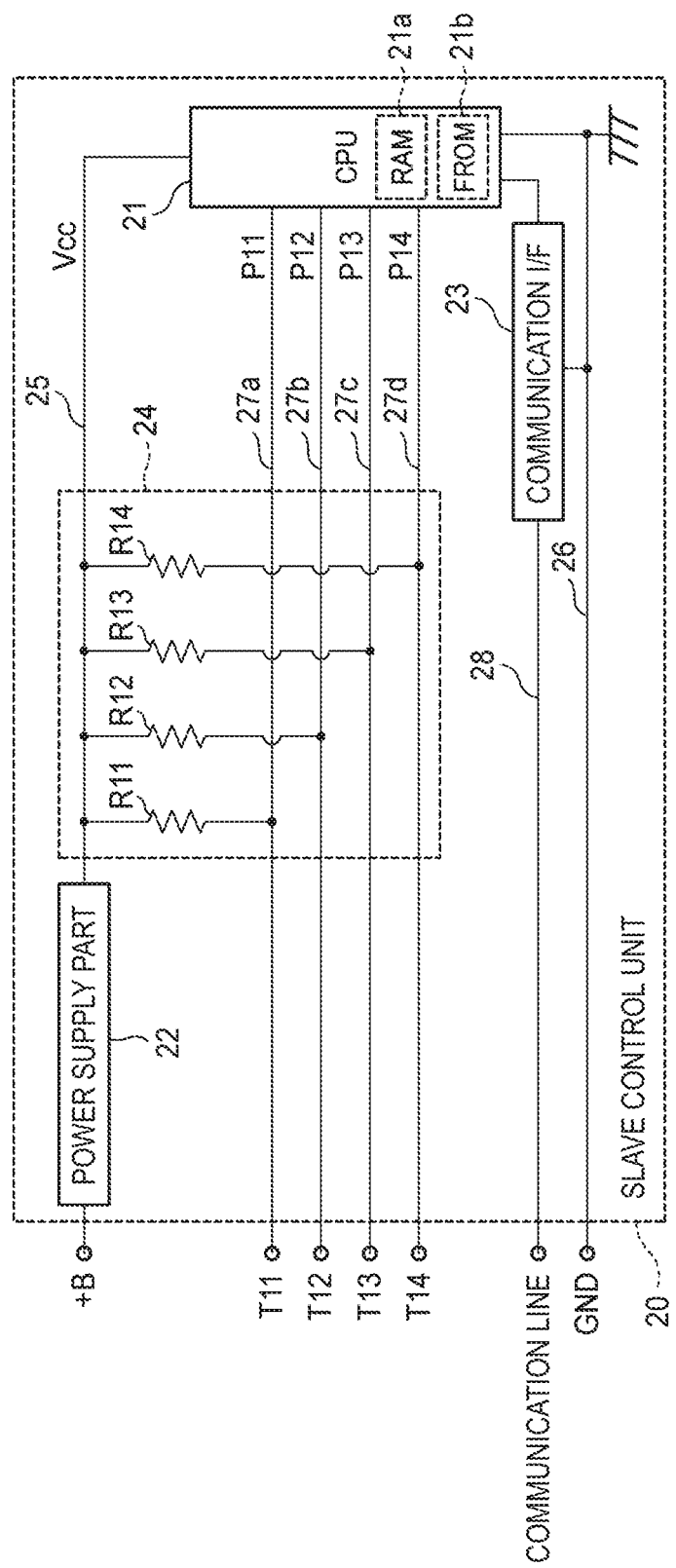
FIG. 2 is a block diagram showing an exemplary configuration of a slave control unit.

An exemplary configuration of an internal configuration of the slave control unit 20 in FIG. 1 is shown in FIG. 2. As shown in FIG. 2, the slave control unit 20 includes a microcomputer (CPU) 21, a power supply part 22, a communication interface (I/F) 23, and a pull-up circuit 24.

The microcomputer 21 operates with a program assembled in advance to achieve a control function necessary for the slave control unit 20. For example, in a case where the input device SE11 and the switches SW11, SW12 are control objects as in the electrical component 30(2) in FIG. 1, the microcomputer 21 processes electrical signals output from these control objects and informs a result thereof to the master control unit 10. Also, in a case of controlling an electrical component incorporating a load, the load is controlled to be powered on according to such as an instruction received from the master control unit 10. The microcomputer 21 also has a function of specifying identification information assigned to the slave control unit 20.

The microcomputer 21 in FIG. 2 includes the four input ports P11, P12, P13, P14 capable of processing a binary signal and a port for communication. The input ports P11, P12, P13, P14 are connected to the terminals T11 to T14 via signal lines 27a, 27b, 27c, 27d respectively.

Also, the microcomputer 21 incorporates a temporary storage memory (RAM) 21a and a flash memory (FROM) 21b. The temporary storage memory 21a is configured by a semiconductor memory, and has storage areas capable of reading and writing data freely. The areas in the temporary storage memory 21*a* are used for temporarily storing various data generated as necessary. The flash memory 21*b* is configured by a nonvolatile semiconductor memory and has storage areas capable of updating data via reading and writing the data. The areas in the flash memory 21*b* are used for storing content of data even in a state where there is no power supply.

The power supply part 22 generates a steady DC voltage (Vcc: for example, 5 V) necessary for operation of a circuit such as the microcomputer 21 based on power of a DC power supply (+B: for example, 12 V) from the power supply line 41*a*.

The pull-up circuit 24 includes four resistors R11 R12, R13, R14. The signal lines 27*a*, 27*b*, 27*c*, 27*d* are connected to a power supply line 25 via the resistors R11, R12, R13, R14 respectively. That is, potentials of the signal lines 27*a*, 27*b*, 27*c*, 27*d* are kept at a high level (Vcc) via the pull-up circuit 24 in an initial state where there is no electrical signal from outside.

As for a type of the input device SE11 inside the electrical component 30(2) which is a control object, it is also conceivable to omit the resistor R11 in the pull-up circuit 24 or replace the input port P11 with an analog signal input port.

The communication interface 23 is a transceiver performing signal processing for the microcomputer 21 to carry out data communication via the communication line 41*c*. The communication interface 23 is connected to the communication line 41*c* of the main wire part 41 via a communication line 28 and a terminal T17.

<Necessity of Identification Information (ID)>

In the control system in FIG. 1, it is possible to perform data communication between the master control unit 10 and a plurality of subordinate slave control units 20 or within the plurality of slave control units 20 via the common communication line 41*c*. Therefore, it is necessary for the master control unit 10 and the slave control units 20 to specify a source and a destination during data communication, and that a plurality of signals on the common communication line 41*c* are further controlled not to collide. Also, it is necessary for the master control unit 10 to control the plurality of slave control units 20 individually since different electrical components 30 are connected to the subordinates of the plurality of slave control units 20 separately.

Therefore, it is necessary to assign unique identification information (ID) to the plurality of slave control units 20 separately. However, all of the plurality of the slave built-in connectors EC1 to EC3 in the control system in FIG. 1 cannot assign different identification information to the slave control units 20 in advance in a case of incorporating the slave control units 20 having common configuration and operation. Accordingly, in the control system in FIG. 1, a wire harness side has a function of determining identification information.

<Specific Example of Relationship Between ID and the Plurality of Input Ports>

A specific example of a corresponding relationship between a design specification relating to use states of the plurality of input ports P11 to P14 and ID assigned to the slave control units 20 is shown in FIG. 4.

The specification in FIG. 4 determines that ID of seven types from ID1 to ID7 can be distinguished by using differences between signals of three of the four input ports P11 to P14 except the input port P11.

In FIG. 4, a circle "○" represents an input port usable for inputting an electric signal. However, it is required that, although there is no significant restriction to a signal input to the input port P11, signals input to the input ports P12 to P14 be binary signals, and that a potential in an initial state or a steady state is in a state prescribed in advance (high potential: Hi) in a case of inputting a signal of a "momentary" type switch. "GND" in FIG. 4 represents that a corresponding input port upon connection of W/H (wire harness) is fixed to a ground potential or a low potential (Lo) equivalent thereto.

Therefore, according to content in FIG. 4, the identification information of seven types from ID1 to ID7 can be assigned to combinations of potentials appearing at the three input ports P12, P13, P14 as follows: a case of "P12=Hi, P13=Hi, P14=Hi": identification information ID1; a case of "P12=Hi, P13=Hi, P14=Lo": identification information ID2; a case of "P12=Hi, P13=Lo, P14=Hi": identification information ID3; a case of "P12=Lo, P13=Hi, P14=Hi": identification information ID4; a case of "P12=Hi, P13=Lo, P14=Lo": identification information ID5; a case of "P12=Lo, P13=Lo, P14=Hi": identification information ID6; and a case of "P12=Lo, P13=Hi, P14=Lo": identification information ID7.

In the specification in FIG. 4, all of the four input ports P11 to P14 can be used for inputting electrical signals since none of potentials of the input ports P11 to P14 is fixed for the slave control unit 20 assigning the identification information ID1. That is, the number of available ports is four.

Meanwhile, for the slave control unit 20 assigning the identification information ID2, P14 cannot be used for inputting electrical signals since the input port P14 is fixed to the ground potential (GND), and only three input ports P11, P12, P13 left can be used. That is, the number of available ports is three.

Similarly, the number of available ports for the slave control unit 20 assigning the identification information ID3 is three, the number of available ports for the slave control unit 20 assigning the identification information ID4 is three, the number of available ports for the slave control unit 20 assigning the identification information ID5 is two, the number of available ports for the slave control unit 20 assigning the identification information ID6 is two, and the number of available ports for the slave control unit 20 assigning the identification information ID7 is two.

<Description of Specific Configuration for Assigning Identification Information>

In the control system in FIG. 1, the electrical component 30(2) connected to the subordinate of the slave built-in connector EC2 outputs three electrical signals. Therefore, it is necessary for the slave control unit 20 in the slave built-in connector EC2 to use three input ports to input the three electrical signals. That is, one of the four input ports P11 to P14 is not used (empty). Accordingly, the input port not in use can be used for assigning identification information.

In the configuration in FIG. 1, the input port P14 in the slave control unit 20 of the slave built-in connector EC2 is empty without an electrical signal applied from the electrical component 30(2). Accordingly, the empty input port P14 is connected to the ground line 41*b* via the electric wire 43*d* and is fixed to the ground potential (Lo).

Also, since the input ports P11 to P14 are constantly applied with a high potential (Hi) via the pull-up circuit 24 in FIG. 2, the input ports P11, P12, P13 except the input port P14 fixed to the ground potential (Lo) are kept at a high potential (Hi) as long as the input device SE11 and the switches SW11, SW12 in the electrical component 30(2) are not in operation.

That is, a combination of the states of the input ports P11 to P14 of the slave control unit 20 in the slave built-in connector EC2 meets a condition of "identification information ID2" in the specification in FIG. 4 if it is in the initial or steady state. Therefore, the slave control unit 20 can specify the "identification information ID2" assigned thereto by comparing the combination of high/low potentials of the input ports P11 to P14 and the condition corresponding to the specification in FIG. 4.

Meanwhile, the slave control unit 20 in the slave built-in connector EC1 in FIG. 1 meets a condition of "identification information ID1" in the specification in FIG. 4 since none of the potentials of the input ports P11 to P14 is fixed to the ground potential. Therefore, the slave control unit 20 in the slave built-in connector EC1 can specify the "identification information ID1" assigned thereto by comparing the combination of high/low potentials of the input ports P11 to P14 and the condition corresponding to the specification in FIG. 4.

Also, the slave control unit 20 in the slave built-in connector EC3 in FIG. 1 meets a condition of "identification information ID3" in the specification in FIG. 4 since only the input port P13 is connected to the ground line 41b via the electric wire 43c. Therefore, the slave control unit 20 in the slave built-in connector EC3 can specify the "identification information ID3" assigned thereto by comparing the combination of high/low potentials of the input ports P11 to P14 and the condition corresponding to the specification in FIG. 4.

<Processing Procedure for Identifying ID>

Figure 5:
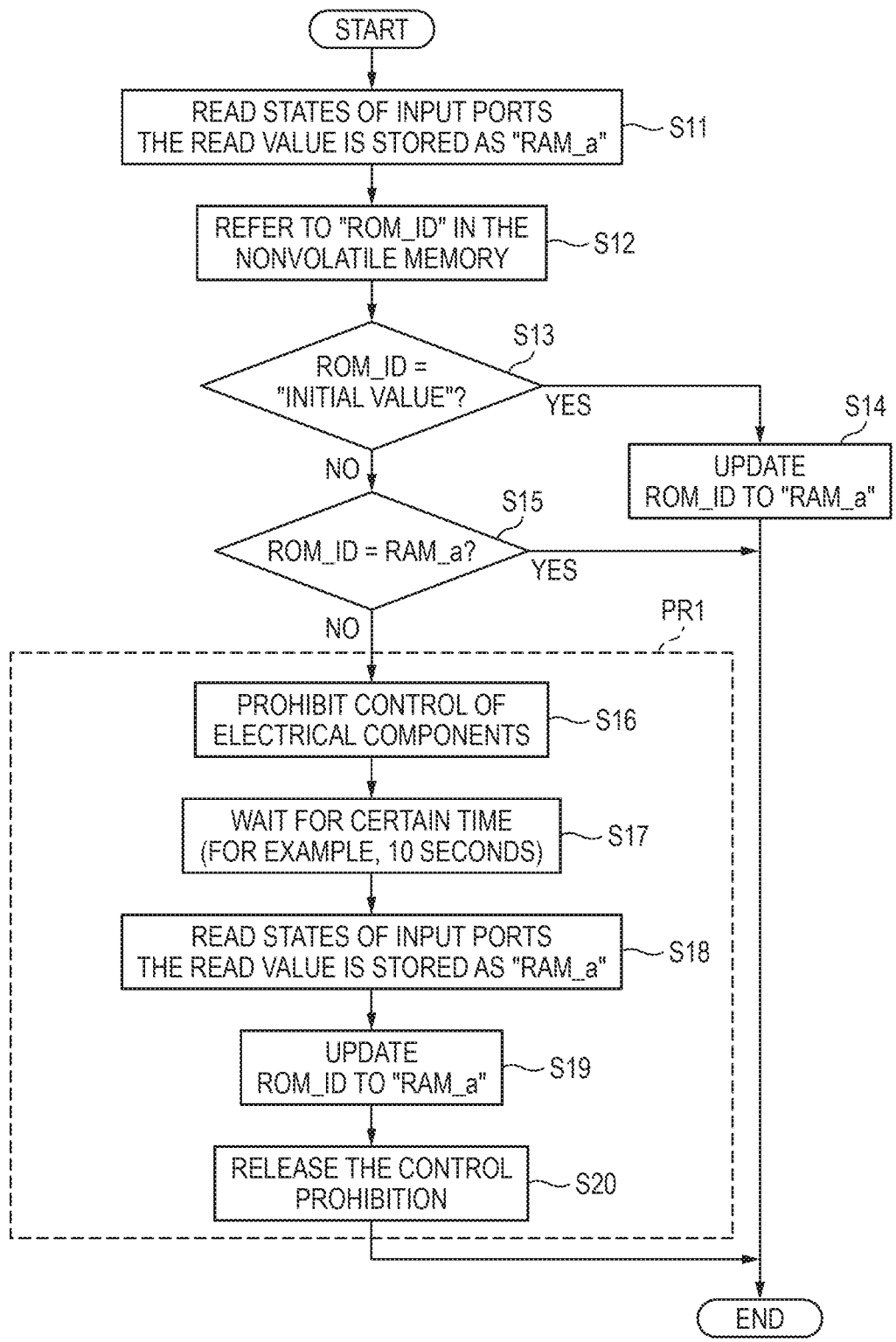
FIG. 5 is a flow chart showing a processing procedure for slave control units to identify their own ID.

In the control system in FIG. 1, a processing procedure for the slave control units 20 to identify their own ID is shown in FIG. 5. That is, microcomputers 21 in the slave control units 20 can identify their own ID and reflect the identified ID to communication operation by performing the processing procedure in FIG. 5. Certainly, it is also possible for a general logic circuit to identify its own ID according to the processing procedure in FIG. 5, which is not limited to the microcomputer 21.

In the processing procedure in FIG. 5, the microcomputers 21 in the slave control units 20 read states of Hi/Lo potentials of three input ports P12 to P14 immediately after the control system is powered on. The read value is temporarily kept as ID temporary data RAM_a in an area assigned to the temporary storage memory 21a (S11).

Also, the microcomputers 21 refer to data in an area assigned to the flash memory 21b which is a nonvolatile memory, that is, content of stored identification information ROM_ID (S12). Incidentally, in an initial state when components of the slave control units 20 are shipped from a factory, an initial value of the content of the identification information ROM_ID such as "0" is written.

Then, the process proceeds to S14 in a case of the initial state (a case of performing a first process), that is, a case where the content of the stored identification information ROM_ID is the "initial value", so as to update the content for latest information. That is, the value of the ID temporary data RAM_a read from the input ports P11 to P14 in S11 is overwritten to a corresponding area of the flash memory 21b in S14 as the content of the stored identification information ROM_ID.

In a case where a value other than the "initial value" as the stored identification information ROM_ID is already written to the flash memory 21b (a case of performing second and subsequent processes), the microcomputers 21 compare the value of the ID temporary data RAM_a and the value of the stored identification information ROM_ID (S15).

If the value of the ID temporary data RAM_a matches the value of the stored identification information ROM_ID in S15, the microcomputers 21 end the processing in FIG. 5. That is, it is determined that the value of the stored identification information ROM_ID continues to be used as its own communication ID as it is since it is not necessary to update the value of the stored identification information ROM_ID.

If the value of the ID temporary data RAM_a does not match the value of the stored identification information ROM_ID in S15, the microcomputers 21 perform an ID re-determination process PR1.

In the ID re-determination process, the microcomputers 21 first turn off the electrical components 30 connected to the subordinates of the slave control units 20, so as to temporarily prohibit control thereto (S16). In this way, malfunction of the electrical components 30 is prevented.

Also, the microcomputers 21 wait for certain time until the potentials of the input ports P11 to P14 are steady. The certain time is assumed to be, for example, 10 seconds. With such waiting, it is possible to exclude an influence of chattering generated upon ON or OFF of a switch contact. Also, since it is usually difficult to imagine that operation of the user also lasts for no less than 10 seconds in a case of pressing the momentary switch, a contact of a corresponding switch returns to a steady state (off) and makes it possible to detect a signal potential in the steady state with the microcomputers 21 waiting for 10 minutes in S17.

The microcomputers 21 read the states of the Hi/Lo potentials of three input ports P12 to P14 in subsequent S18. The read value is temporarily kept as ID temporary data RAM_a in an area assigned to the temporary storage memory 21a. The microcomputers 21 overwrite the value of the ID temporary data RAM_a to a corresponding area of the FROM 21b in S19 as the content of the stored identification information ROM_ID, thereby updating the content.

Since the identification information to be used by the slave control units 20 is determined via the above processing, the microcomputers 21 return to a state of being capable of controlling the electrical components 30 prohibited from operation in S16 (S20).

Incidentally, in the processing in FIG. 5, although the electrical components 30 are prohibited from operation in the case of performing the ID re-determination process PR1, it is also conceivable to continue the operation of the electrical components 30 by selecting preferably the value of the stored identification information ROM_ID before updating as identification information according to the case. Conversely, it is also conceivable to continue the operation of the electrical components 30 by selecting preferably the value of the ID temporary data RAM_a as the identification information according to the case.

The determined value of the stored identification information ROM_ID via the processing in FIG. 5 is used in general communication operation as ID for the microcomputers 21 to specify themselves. Also, the microcomputers 21 can detect the states of the input device SE11, the switches SW11, SW12 in the electrical components 30(2) and reflect the states to control by monitoring the potentials of ports of the four input ports P11 to P14 except a specific port fixed to the ground potential.

That is, the four input ports P11 to P14 of the slave control units 20 are shared for two types of uses: being used for specifying their own ID in an initial state of power on, and for detecting the states of the input device SE11 and the switches SW11, SW12 via regular processing.

<Description of ID Reloading Prohibition Function & Necessity Thereof>

For example, it is conceivable that temporary contact failure or aged deterioration may happen in a place of such as the terminals T11 to T14 of the slave built-in connectors EC1, EC2, EC3 under an influence of mechanical vibration generated when the vehicle is travelling. When such contact failure or aged deterioration occurs, wrong identification information during performing of the processing in FIG. 5 is written into the flash memory 21b as stored identification information ROM_ID, and system malfunction occurs due to use of the wrong identification information. In order to prevent such malfunction, it is necessary to prohibit rewriting of the stored identification information ROM_ID in a situation where it is not necessary to rewrite the identification information. The realizing of the above is referred to as "ID reloading prohibition function".

<Operation of Slave Control Units 20>

Figure 6:
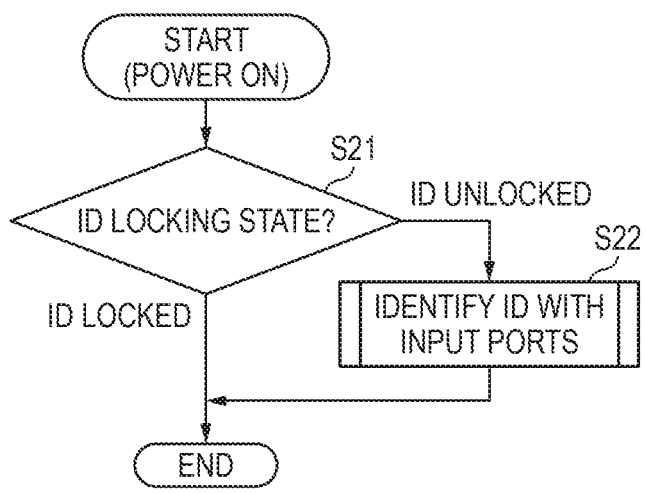

An exemplary operation of the slave control units 20 at power on is shown in FIG. 6. That is, the processing in FIG. 6 is performed when the power supplies of the slave control units 20 are powered on to start the microcomputers 21. Also, a step S22 in FIG. 6 corresponds to content of the processing in FIG. 5.

Figure 7:
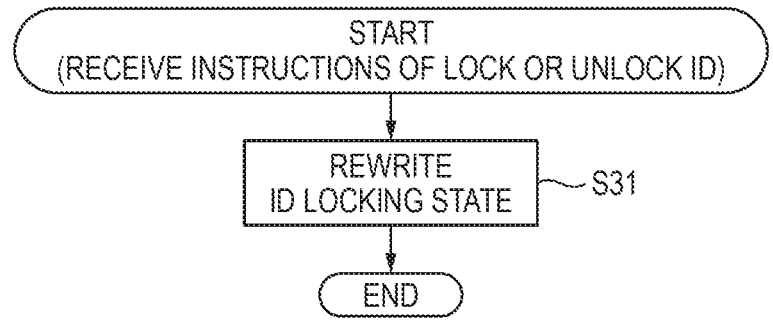
FIG. 7 is a flow chart showing exemplary operation of the slave control units upon receiving prescribed instructions.

The exemplary operation of the slave control units 20 upon receiving prescribed instructions is shown in FIG. 7. In this example, the microcomputers 21 perform the processing in FIG. 7 when the slave control units 20 receive instructions of either "ID lock" or "ID unlock" from the master control unit 10.

When the microcomputers 21 start operating according to the power on of the slave control units 20, the microcomputers 21 refer to a current "ID locking state" in S21 in FIG. 6. The "ID locking state" can be read as a state of an "ID locking state flag" assigned to a prescribed area in the flash memory 21b in advance.

If the "ID locking state" means that the ID is unlocked, the microcomputers 21 perform S22. That is, with the processing in FIG. 5, the identification information ROM_ID stored as necessary as mentioned above is updated based on the combination of the potentials of the input ports P11 to P14.

Meanwhile, if the "ID locking state" means that the ID is locked, the microcomputers 21 do not perform S22. That is, the reloading of the ID from the input ports P11 to P14 is prohibited.

Also, when the slave control units 20 receive the "ID lock" or the "ID unlock" from the master control unit 10, the microcomputers 21 perform a step S31 in FIG. 7. In a case of receiving the instruction of "ID lock", the microcomputers 21 rewrite the "ID locking state flag" into "ID locked". In a case of receiving the instruction of "ID unlock", the microcomputers 21 rewrite the "ID locking state flag" into "ID unlocked".

<Operation of Master Control Unit 10>

Figure 8:
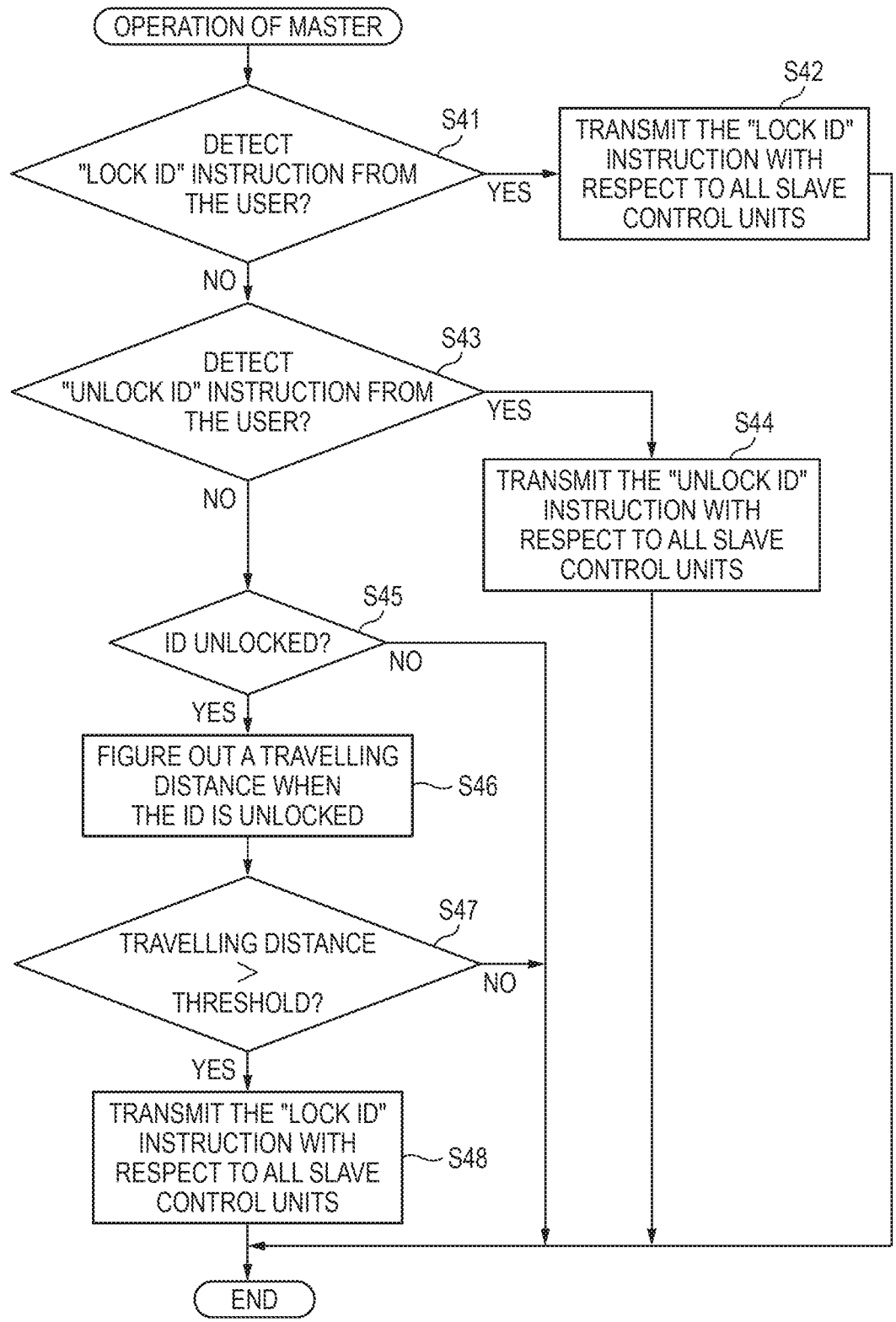
FIG. 8 is a flow chart showing exemplary operation of a master control unit.

An exemplary operation of the master control unit 10 is shown in FIG. 8. With operation in FIG. 8 being performed by the master control unit 10, the above instructions of "ID lock" or "ID unlock" can be transmitted to the slave control units 20.

For example, at an assembly factory of a vehicle manufacturer or at a vehicle dealer's, an operator can send a prescribed instruction to the master control unit 10 by using a prescribed diagnosis device in a state of connecting the diagnosis device to the control system in FIG. 1 mounted to the vehicle.

The master control unit 10 proceeds to S42 when detecting a manual "ID lock" instruction from a user (operator) in S41 in FIG. 8, and transmits the "ID lock" instruction which is targeted for controlling all of the slave control units 20 connected to the subordinates of the master control unit 10.

Also, the master control unit 10 proceeds to S44 when detecting a manual "unlock ID" instruction from the user (operator) in S43 in FIG. 8, and transmits the "unlock ID" instruction which is targeted for controlling all of the slave control units 20 connected to the subordinates of the master control unit 10.

Meanwhile, when the "ID lock" of all of the slave control units 20 is unlocked, the master control unit 10 proceeds to S46 from S45, and figures out a travelling distance of the vehicle when the ID is unlocked. Incidentally, in a case where the state moves from ID locked to released, a driving distance from this time point on is figured out once the driving distance at the time point is reset.

Then, in a case where the driving distance figured out in S46 exceeds a threshold (for example, 10 km) prescribed in advance, the master control unit 10 proceeds to S48, and transmits the "unlock ID" instruction which is targeted for controlling all of the slave control units 20.

That is, in a case of the operation in FIG. 8, the master control unit 10 can transmit the instructions of "ID lock" or "ID unlock" according to manual operation of the operator, and transmit automatically the instruction of "ID lock" based on the driving distance.

Then, the "ID locking state flag" of each of the slave control units 20 is rewritten in S31 according to the instruction of "ID lock" or "ID unlock" transmitted by the master control unit 10, such that the "ID reloading prohibition function" is carried out with the processing of the microcomputers 21 in FIG. 6.

For example, in a case of performing work such as adding another electrical component or reattaching a connection position on the wire harness in a factory or at a vehicle dealer's, the stored identification information ROM_D of the slave control units 20 can be rewritten. That is, even if the slave control units 20 are already in the "ID locked" state, the operator sends the manual "unlock ID" instruction to the master control unit 10 by using such as a diagnosis device, such that the "ID locking state flag" of the slave control units 20 is rewritten, and the identification information is rewritten according to potentials of the input ports P11 to P14.

Also, in a case where work in the factory or at the vehicle dealer's is finished, and it is desired to avoid rewriting of more identification information, the operator sends the manual "ID lock" instruction to the master control unit 10 by using such as a diagnosis device, such that the "ID locking state flag" of the slave control units 20 is rewritten, and the "ID reloading prohibition function" is taken into effect.

Also, even in a case where the operator does not send the manual "ID lock" instruction to the master control unit 10, the "ID lock" instruction is automatically transmitted to all of the slave control units 20 from the master control unit 10 in S48 in FIG. 8 with the vehicle travelling a distance no less than as prescribed. In this way, the "ID locking state flag" of each of the slave control units 20 is rewritten, such that the "ID reloading prohibition function" is effective.

<Description of Modifications>

Figure 9:
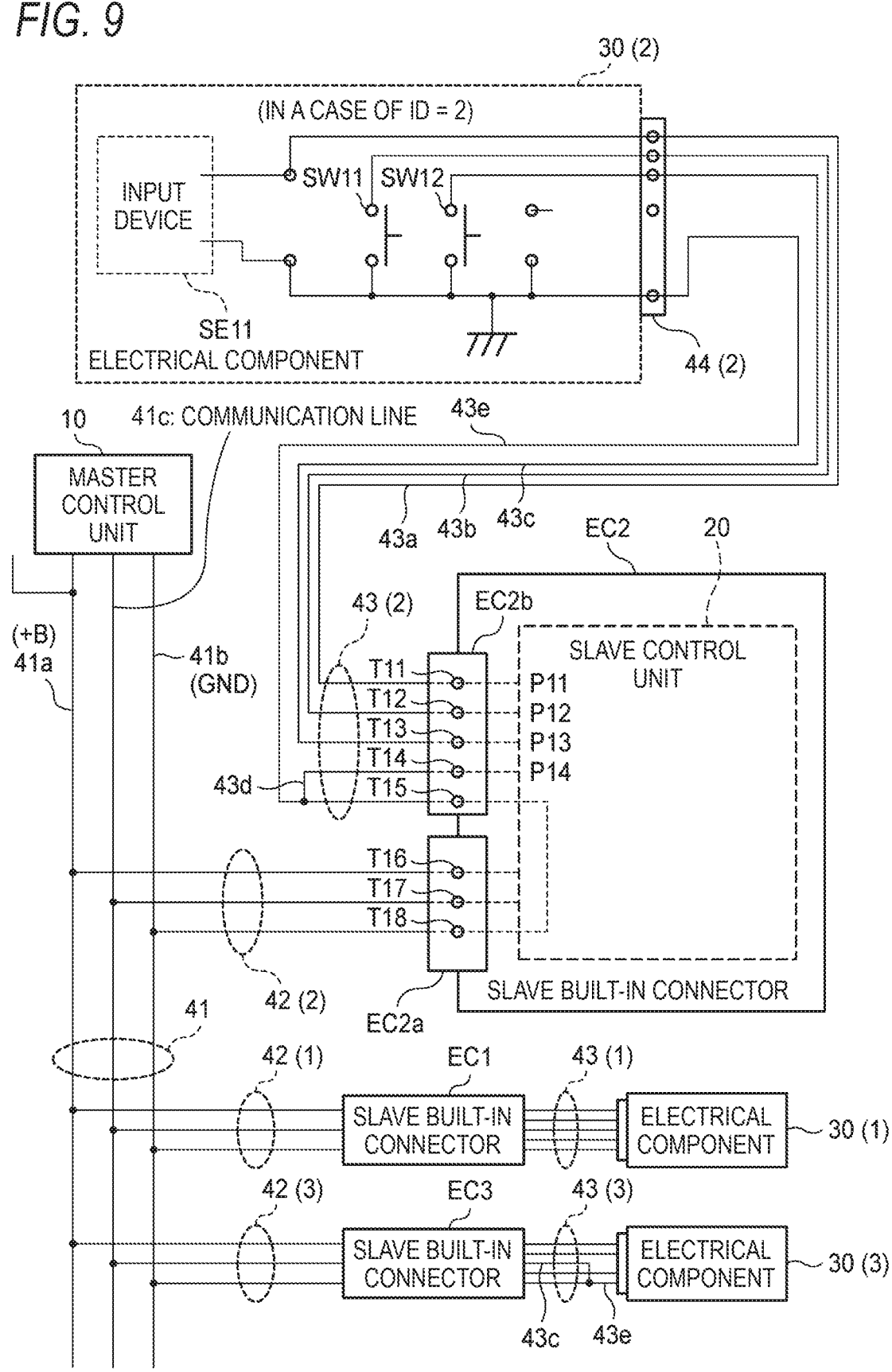
FIG. 9 is a connection diagram showing a configuration of an exemplary deformation of the control system in FIG. 1.

A configuration of an exemplary deformation of the control system in FIG. 1 is shown in FIG. 9. Incidentally, elements in FIG. 9 corresponding to elements in FIG. 1 are given identical numerals.

In a control system in FIG. 9, connection destinations of the electric wire 43d and the electric wire 43c are different from the configuration in FIG. 1. Also, a connection part EC2a for connecting the sub harness 42(2) to the slave built-in connector EC2 and a connection part EC2b for connecting the sub harness 43(2) to the slave built-in connector EC2 are separate.

That is, in the configuration in FIG. 9, the electric wire 43d in the sub harness 43(2) is connected to the adjacent electric wire 43e. That is, since the electric wire 43e of the sub harness 43(2) is connected to the ground line 41b via the connection part EC2b, the slave control unit 20, the connection part EC2a, and the sub harness 43(2), the same potential as the configuration in FIG. 1 can be applied to the input port P14 by simply connecting the electric wire 43d of the sub harness 43(2) to the adjacent electric wire 43e. In this way, the assigned ID can be changed by simply changing a configuration in the sub harness 43(2) without connecting part of the sub harness 43(2) to the main wire part 41.

Also, in the configuration in FIG. 9, the electric wire 43c in the sub harness 43(3) is connected to the adjacent electric wire 43e. That is, since the electric wire 43e of the sub harness 43(3) is connected to the ground line 41b via the connection part EC2b, the slave control unit 20 and the sub harness 42(3), the same potential as the configuration in FIG. 1 can be applied to the input port P13 by simply connecting the electric wire 43c of the sub harness 43(3) to the adjacent electric wire 43e. In this way, the assigned ID can be changed by simply changing the configuration in the sub harness 43(3) without connecting part of the sub harness 43(3) to the main wire part 41.

Also, since the connection part EC2a and the connection part EC2b are separate, it is possible to manufacture the sub harness 42(2) and the sub harness 43(2) as independent wire harness components separately. Therefore, in a case where, for example, configurations of the electrical components 30 connected to the system are changed, or in a case of adding another electrical component 30, the assigned ID can be changed by simply changing the configuration of corresponding sub harness 43(2) without making changes to other component elements.

<Advantages of Control Device and Control System>

In either control system in FIG. 1 and FIG. 9, it is possible to commonize hardware and software of the slave control units 20 incorporated in the slave built-in connectors EC1, EC2, EC3. Accordingly, the slave control units 20 of the same part number can be mounted to each of the connectors EC1, EC2, EC3. Therefore, misassembly in manufacturing work can be prevented, and the manufacturing costs can be reduced. Also, the component costs can be reduced via quantity effect. Costs associated with replacement work can be reduced since it is not necessary to perform particular work for assigning ID during component replacement. Incidental costs can be reduced since it is possible to reduce the number of stock of components in use.

Also, it is possible to assign automatically suitable ID to each of the slave control units 20 by simply connecting a wire harness even if a particular component for assigning ID such as a resistor is not attached to each of the slave control units 20. Therefore, even in the case of adding another electrical component to the system, it is possible for the slave control units 20 to have a function for controlling a corresponding electrical component by simply adding the slave control unit 20 and a sub harness.

Also, since the input ports P11 to P14 of the slave control units 20 can be shared for a function of reading assigned ID and a function of reading electrical signals from the electrical components 30, it is not necessary to increase the number of necessary imports, thereby suppressing an increase in costs. Moreover, with the processing procedure in FIG. 5, it is possible to prevent assigning of wrong ID since the ID is not determined when the potentials of the input ports changes.

Also, in a case of performing the processing in FIG. 5, particular time wait for confirming that the potentials of the input ports P11 to P14 are in a steady state is unnecessary since it is confirmed in S15 that whether the stored identification information ROM_ID matches the ID temporary data RAM_a. Therefore, waiting time from when the user starts an engine of the vehicle until when an onboard system can operate in a normal state is shortened.

If the value of the ID temporary data RAM_a does not match the value of the stored identification information ROM_ID in S15 in FIG. 5, it is possible to prevent the malfunction caused by chattering of a switch point via performing the ID re-determination process PR1.

The "ID reloading prohibition function" can be realized since the slave control units 20 perform (the operation in FIG. 6. Therefore, it is possible to prevent temporary contact failure and the influence of such as aged deterioration.

Also, since the master control unit 10 performs the operation in FIG. 8, the "ID reloading prohibition function" can be switched ON/OFF via manual operation of the operator and be ON automatically.

Here, characteristics of the control device and the control system according to the above embodiments of the present invention are summarized briefly in the following (1) to (4) respectively. (1) A control device used as one of a plurality of control devices (slave control unit 20) connected with each other via a vehicle wiring member including a power supply line and a communication line, the control device including:

a plurality of input ports (P11 to P14) connected with an electrical component (30);

a potential setting unit (electric wires 43c, 43d) for setting the plurality of input ports to any potential of a first reference potential and a second reference potential different from the first reference potential;

an ID specifying unit (microcomputer 21, S11) for specifying identification information of the control device based on a combination of potentials set to the plurality of input ports;

a storage unit (temporary storage memory (RAM) 21a, flash memory (FROM) 21b) for storing the specified identification information; and a control unit (microcomputer 21) for controlling the electrical components based on the specified identification information, wherein in a case where the identification information specified at start of the control device is different from the identification information stored in the storage unit, the ID specifying unit prohibits the identification information specified at the start of the control device from being written into the storage unit for a prescribed time, and specifies the identification information again after the prescribed time and writes it into the storage unit (ID re-determination process PR1).

(2) The control device according to (1), wherein in a case where the storage unit is in an initial state, the ID specifying unit writes the identification information specified at the start into the storage unit before the prescribed time elapses (S13, S14).

(3) The control device according to (1) or (2), wherein in a case where the identification information specified at the start is different from the identification information stored in the storage unit, the control unit prohibits control of the electrical components until the prescribed time elapses (S16, S20).

(4) A control system including:
a plurality of slave control units which are the control devices according to any one of (1) to (3); and
a master control unit for controlling the plurality of slave control units via the vehicle wiring member, wherein the master control unit, after satisfying a prescribed condition, controls an ID specifying unit of the plurality of slave control units to prohibit the identification information from being written into the storage units (see FIG. 6).

What is claimed is:

1. A control device used as one of a plurality of control devices connected with each other via a vehicle wiring member including a power supply line and a communication line, the control device comprising:
    a plurality of input ports to which electrical components are connected;
    a potential setting unit that sets the plurality of input ports to have any one of a first reference potential and a second reference potential different from the first reference potential;
    an ID specifying unit that specifies identification information of the control device based on a combination of electric potentials of the plurality of input ports;
    a storage unit that stores the specified identification information; and
    a control unit that controls the electrical component based on the specified identification information,
    wherein in a case where the identification information specified at start of the control device is different from the identification information stored in the storage unit, the ID specifying unit prohibits the identification information specified at the start of the control device from being written into the storage unit for a prescribed time, and specifies the identification information again after the prescribed time and writes it into the storage unit.

2. The control device according to claim 1, wherein in a case where the storage unit is in an initial state, the ID specifying unit writes the identification information specified at the start into the storage unit before the prescribed time elapses.

3. The control device according to claim 1, wherein in a case where the identification information specified at the start is different from the identification information stored in the storage unit, the control unit prohibits control of the electrical component until the prescribed time elapses.

4. A control system comprising:
slave control units, each of which is the control device according to claim 1; and
a master control unit that controls the plurality of slave control units via the vehicle wiring member,
wherein the master control unit, after satisfying a prescribed condition, controls an ID specifying unit of the plurality of slave control units to prohibit the identification information from being written into the storage unit.

5. The control system according to claim 4,
wherein the master control unit is separate from the control device.

6. The control device according to claim 1, further comprising:
a second storage unit separate from the storage unit,
wherein the ID specifying unit is further configured to specify second identification information of the control device based on a second combination of electric potentials of the plurality of input ports,
wherein the second combination of electric potentials is read by the ID specifying unit in response to an elapse of the prescribed time,
wherein the combination of electric potentials of the plurality of input ports is read by the ID specifying unit before the elapse of the prescribed time,
wherein the control unit further controls the second storage unit to store, after the elapse of the prescribed time, the second identification information, and
wherein the control unit further controls the storage unit to store, after the prescribed time, the identification information, specified at the start of the control device, by rewriting the identification information stored in the storage unit with the second identification information stored in the second storage unit.

* * * * *